United States Patent
Lee et al.

(10) Patent No.: US 10,976,933 B2
(45) Date of Patent: Apr. 13, 2021

(54) STORAGE DEVICE, STORAGE SYSTEM AND METHOD OF OPERATING THE SAME

(71) Applicant: Samsung Electronics Co., Ltd., Suwon-si (KR)

(72) Inventors: Young-min Lee, Seoul (KR); Sung-ho Seo, Seoul (KR); Hwa-seok Oh, Yongin-si (KR); Kyung-phil Yoo, Seoul (KR); Seong-yong Jang, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 86 days.

(21) Appl. No.: 15/860,756

(22) Filed: Jan. 3, 2018

(65) Prior Publication Data
US 2019/0026029 A1 Jan. 24, 2019

(30) Foreign Application Priority Data
Jul. 24, 2017 (KR) ........................ 10-2017-0093691

(51) Int. Cl.
*G06F 3/00* (2006.01)
*G06F 3/06* (2006.01)
*G06F 9/4401* (2018.01)

(52) U.S. Cl.
CPC ............ *G06F 3/0611* (2013.01); *G06F 3/065* (2013.01); *G06F 3/0659* (2013.01); *G06F 3/0679* (2013.01); *G06F 9/4406* (2013.01)

(58) Field of Classification Search
None
See application file for complete search history.

(56) References Cited

U.S. PATENT DOCUMENTS

| | | |
|---|---|---|
| 6,760,256 B2 | 7/2004 | Imamiya |
| 7,679,133 B2 | 3/2010 | Son et al. |
| 7,849,302 B2 | 12/2010 | Wu |
| 8,488,381 B2 | 7/2013 | Kim et al. |
| 8,527,691 B2 | 9/2013 | Honda et al. |
| 8,553,466 B2 | 10/2013 | Han et al. |
| 8,559,235 B2 | 10/2013 | Yoon et al. |
| 8,631,133 B1 * | 1/2014 | Jonnala ................... H04L 69/14 709/227 |
| 8,654,587 B2 | 2/2014 | Yoon et al. |
| 9,477,484 B2 | 10/2016 | Surapuram |
| 9,563,385 B1 * | 2/2017 | Kowalski .............. G06F 3/0665 |
| 2004/0252672 A1 * | 12/2004 | Nemazie ............ G06F 13/4022 370/351 |
| 2008/0074928 A1 * | 3/2008 | Choi ................... G11C 11/5628 365/185.17 |
| 2010/0122017 A1 | 5/2010 | Toyama |

(Continued)

*Primary Examiner* — David Yi
*Assistant Examiner* — Craig S Goldschmidt
(74) *Attorney, Agent, or Firm* — Harness, Dickey & Pierce, P.L.C.

(57) ABSTRACT

Provided are a storage device, a storage system, and a method of operating the same. A storage device communicably connected to a host may include a non-volatile memory configured to store at least one piece of boot data necessary for booting the storage device; and a device controller configured to receive an interface initialize command (IFIC) from the host, predict requested boot data requested by the host from among the at least one piece of boot data based on the IFIC, and control the non-volatile memory to read the requested boot data.

18 Claims, 15 Drawing Sheets

(56) References Cited

U.S. PATENT DOCUMENTS

| | | |
|---|---|---|
| 2011/0016300 A1 | 1/2011 | Lee |
| 2011/0233648 A1 | 9/2011 | Seol et al. |
| 2012/0155171 A1 | 6/2012 | Komine et al. |
| 2013/0179460 A1* | 7/2013 | Acuna ................... G06F 17/276 707/758 |
| 2014/0092104 A1 | 4/2014 | Tsai et al. |
| 2014/0334232 A1 | 11/2014 | Nam et al. |
| 2017/0048304 A1 | 2/2017 | Singh et al. |
| 2017/0052794 A1 | 2/2017 | Berke et al. |

\* cited by examiner

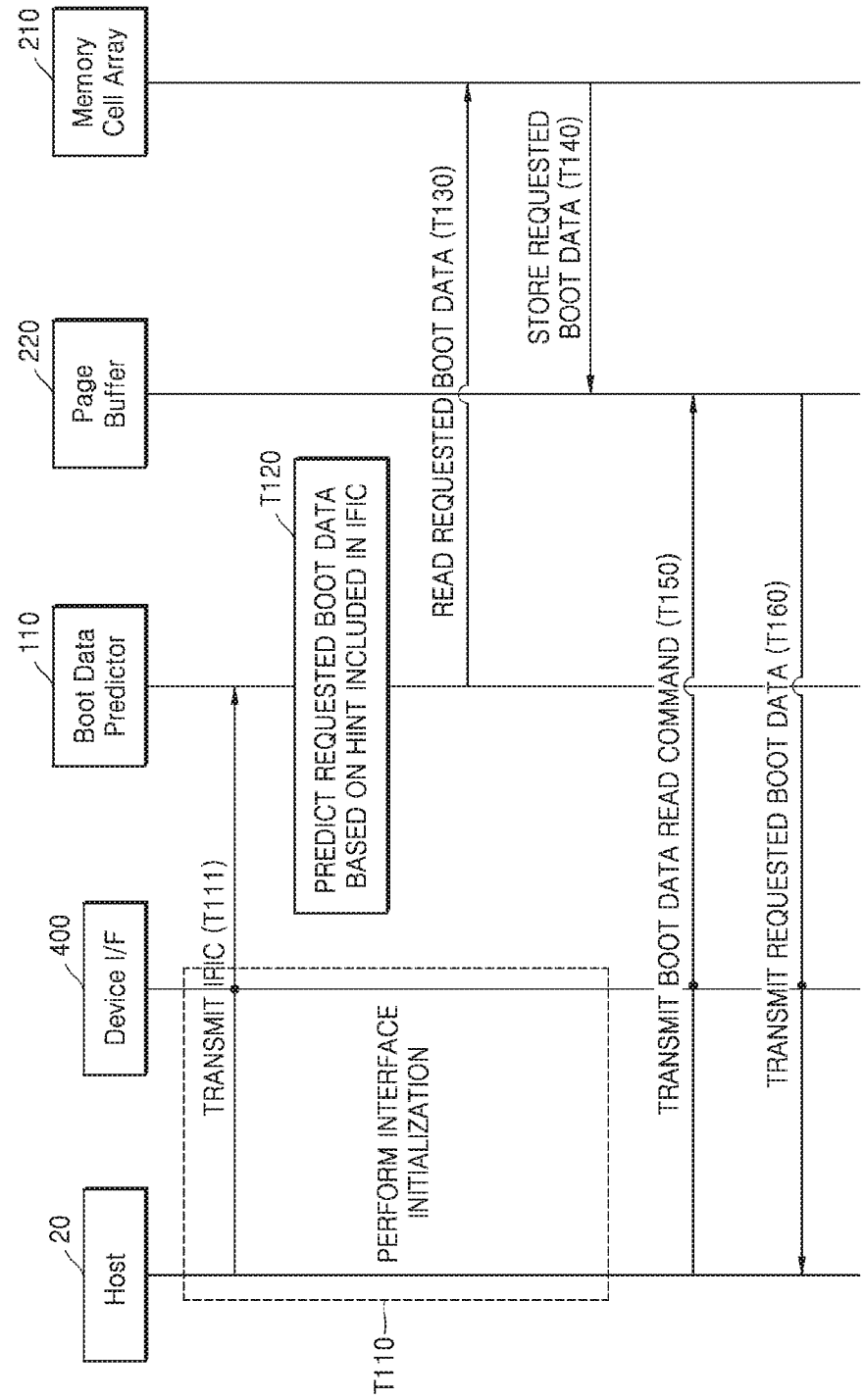

STORAGE DEVICE, STORAGE SYSTEM AND METHOD OF OPERATING THE SAME

CROSS-REFERENCE TO RELATED APPLICATION

This application claims the benefit of Korean Patent Application No. 10-2017-0093691, filed on Jul. 24, 2017, in the Korean Intellectual Property Office, the disclosure of which is incorporated herein in its entirety by reference.

BACKGROUND

The inventive concept relates to a storage device, a storage system, and a method of operating the same, and more particularly, to a storage device capable of reducing time for booting a host.

A storage system includes a host and a storage device. The host and the storage device are connected to each other via one of various interface standards, such as universal flash storage (UFS), serial ATA (SATA), small computer system interface (SCSI), serial attached SCSI (SAS), and embedded MMC (eMMC). Booting is performed in order for the host and the storage device to normally communicate with each other. To this end, boot data needs to be transferred from the storage device to the host.

SUMMARY

The inventive concept provides a storage device capable of reducing a booting time and a method of operating the same.

The inventive concept also provides a storage system capable of reducing a booting time and a method of operating the same.

According to an aspect of the inventive concept, there is provided a storage device communicably connected to a host, the storage device including a non-volatile memory configured to store at least one piece of boot data necessary for booting the storage device; and a device controller configured to receive an interface initialize command (IFIC) from the host, predict requested boot data requested by the host from among the at least one piece of boot data based on the IFIC, and control the non-volatile memory to read the requested boot data.

According to another aspect of the inventive concept, there is provided a method of operating a storage device including a non-volatile memory and a volatile memory, the method including, in response to at least one interface initialize command (IFIC) received from a host that is communicably connected to the storage device, entering an interface initialization mode for an interface initialization with respect to the host; reading boot data from the non-volatile memory in response to the at least one IFIC; and storing the boot data in the volatile memory.

BRIEF DESCRIPTION OF THE DRAWINGS

Embodiments of the inventive concept will be more clearly understood from the following detailed description taken in conjunction with the accompanying drawings in which:

FIG. 5 is a diagram showing a method of operating components of a storage system according to an example embodiment;

DETAILED DESCRIPTION OF THE EMBODIMENTS

Figure 1:
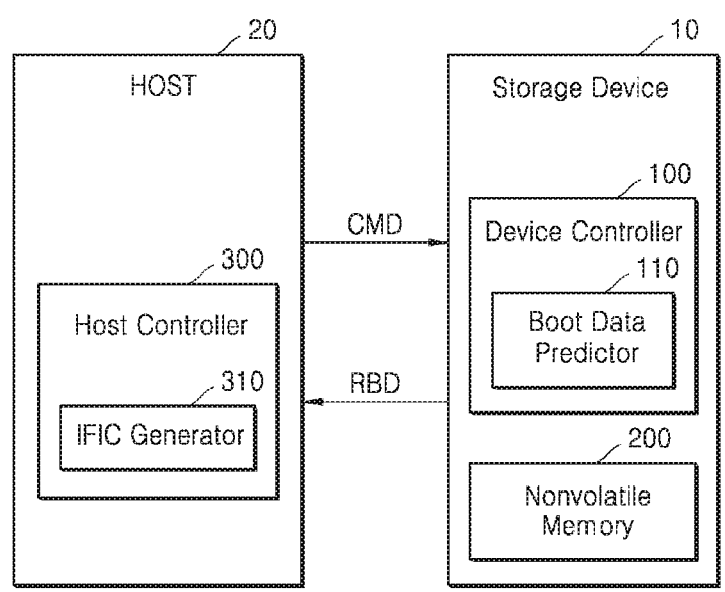
FIG. 1 is a block diagram showing a storage system according to an example embodiment.

FIG. 1 is a block diagram showing a storage system according to an example embodiment.

Referring to FIG. 1, a storage system 1 may include a storage device 10 and a host 20. The storage device 10 may include a device controller 100 and a non-volatile memory 200, and the device controller 100 may include a boot data predictor 110. Furthermore, the host 20 may include a host controller 300, and the host controller 300 may include an interface initialize command (IFIC) generator 310.

The storage system 1 may be a personal computer (PC), a data server, a network-attached storage (NAS), an Internet of Things (IoT) device, or a portable electronic device. The portable electronic device may be a laptop, a mobile phone, a smart phone, a tablet PC, a personal digital assistant (PDA), an enterprise digital assistant (EDA), a digital camera, an audio device, a portable multimedia player (PMP) a personal navigation device (PND), an MP3 player, a handheld game console, an e-book, and a wearable device.

The storage device 10 may store data received from the host 20. When a command CMD from the host 20 is a write command, the storage device 10 may store data received from the host 20 by writing the data to the non-volatile memory 200. When a command CMD from the host 20 is a read command, the storage device 10 may read data stored in the non-volatile memory 200 and output the read data to the host 20. Furthermore, while the storage device 10 is being booted, the storage device 10 may output requested boot data RBD necessary for booting to the host 20. Boot data may refer to data including various configuration information necessary for booting a device. The non-volatile memory 200 may store a plurality of pieces of boot data, where a specific piece of boot data may be requested by the host 20. Hereinafter, boot data requested by the host 20 to boot the storage device 10 will be referred to as requested boot data RBD.

The host 20 may output various commands CMDs to the storage device 10. The command CMD may include not only a read command and a write command as described above, but also an IFIC. The storage device 10 may be connected to the host 20 through a device interface and a host interface. Interface initialization between a device interface of the storage device 10 and a host interface of the host 20 may be necessary when the storage device 10 is booted. To perform an interface initialization, the host 20 may output an IFIC to the storage device 10.

According to an example embodiment, the storage device 10 may read requested boot data RBD from the non-volatile memory 200 in advance in response to an IFIC received from the host 20 and store the requested boot data RBD in a volatile memory (not shown). After completing an interface initialization according to the IFIC, the host 20 may output a boot data read command for reading the requested boot data RBD to the storage device 10. The storage device 10 may output the requested boot data RBD stored in the volatile memory to the host 20 in response to the boot data read command. The IFIC may include at least one of a PHY layer initialize command, a link layer initialize command, and a transport layer initialize command. The storage device 10 may read the requested boot data RBD from the non-volatile memory 200 in advance based on at least one of the PHY layer initialize command, the link layer initialize command, and the transport layer initialize command.

The host controller 300 may be any one of a plurality of modules provided in an application processor, and the application processor may be implemented in a system-on-chip (SoC). The host controller 300 may output various signals for controlling the host 20. For example, the host controller 300 may generate a read command for reading data from the storage device 10 and output the read command to the storage device 10. The host controller 300 may include the IFIC generator 310. The IFIC generator 310 may generate an IFIC for initiating an interface initialization. According to an example embodiment, when the IFIC generator 310 generates an IFIC, the IFIC generator 310 may include information regarding requested boot data RBD. Hereinafter, information regarding requested boot data RBD included in an IFIC will be referred to as a hint.

The device controller 100 may output various signals for controlling the storage device 10. For example, when a read command is received from the host 20, the device controller 100 may output various signals to the non-volatile memory 200, thereby reading data from the non-volatile memory 200 and outputting the data to the host 20.

The device controller 100 may include the boot data predictor 110. The boot data predictor 110 may predict requested boot data RBD to be output to the host 20 based on an IFIC received from the host 20. In other words, before the storage device 10 receives a read command regarding requested boot data RBD from the host 20, the boot data predictor 110 may predict which boot data is the requested boot data RBD. According to an example embodiment, the boot data predictor 110 may predict which boot data is requested boot data RBD based on a hint included in an IFIC.

The non-volatile memory 200 may include a memory device in which data stored therein is not destroyed even when power supply is interrupted. The non-volatile memory 200 may include, but not limited to, a NAND flash memory, a vertical NAND (VNAND) flash memory, a NOR flash memory, resistive random access memory (RRAM), phase-change random access memory (PRAM), or magnetoresistive random access memory (MRAM). The non-volatile memory 200 may be implemented as a 3-dimensional array structure. Furthermore, the non-volatile memory 200 may be implemented as a magnetic disk device as well as a semiconductor memory device. Example embodiments of the inventive concept are not only applicable to a flash memory in which a charge storage layer includes a conductive floating gate, but also to a charge trap flash in which a charge storage layer includes an insulating film. Although the non-volatile memory 200 is described herein as being a flash memory, the inventive concept is not limited thereto.

The non-volatile memory 200 may store at least one piece of boot data. Requested boot data RBD from among the at least one piece of boot data may be output from the non-volatile memory 200 to the host 20 through the device controller 100 during a booting process. According to an example embodiment, a plurality of pieces of boot data may be stored in the non-volatile memory 200, and the host 20 may need requested boot data RBD from among the plurality of pieces of boot data. Therefore, after an interface initialization is completed, the host 20 may output a read command for reading the requested boot data RBD to the storage device 10.

According to an example embodiment, before the boot data predictor 110 receives a read command regarding requested boot data RBD via an IFIC from the host 20, the requested boot data RBD may be predicted in advance and read from the non-volatile memory 200, thereby reducing a time period required for a booting process.

Figure 2A:
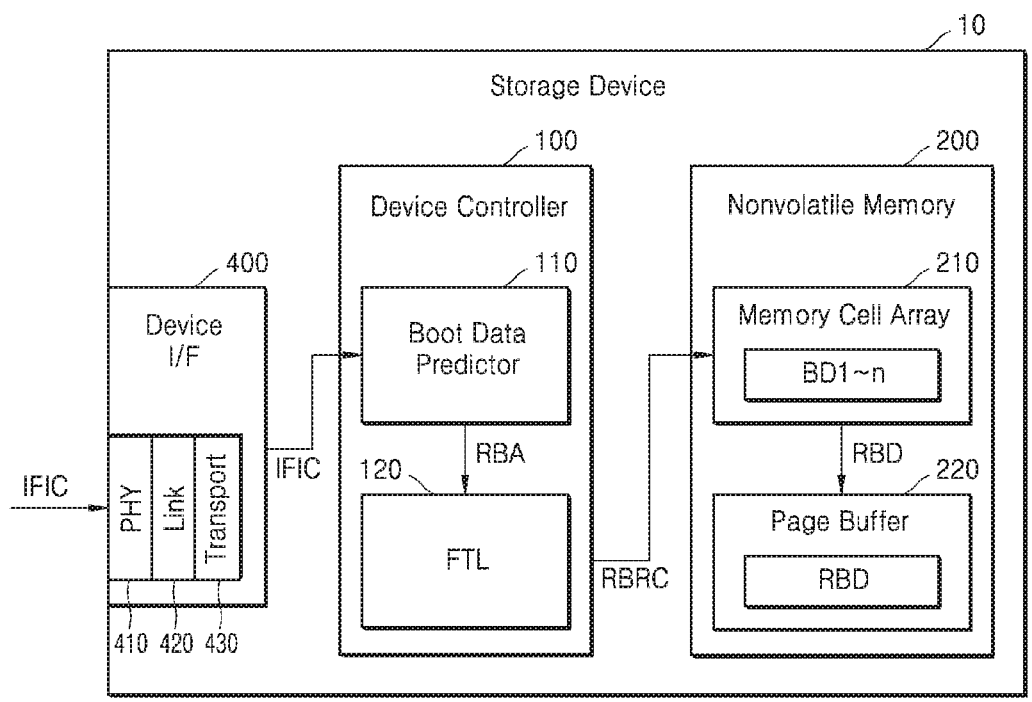
FIG. 2A is a block diagram showing a storage device according to an example embodiment.

FIG. 2A is a block diagram showing a storage device according to an example embodiment. In particular, FIG. 2A is a block diagram showing for the storage device to read out a requested boot data RBD form the non-volatile memory 200 when an IFIC is received from a host (e.g., the host 20 of FIG. 1).

Referring to FIGS. 1 and 2A, the storage device 10 may include the device controller 100, the non-volatile memory 200, and a device interface 400, and the device controller 100 may include the boot data predictor 110 and a flash translation layer (FTL) 120. The non-volatile memory 200 may include a memory cell array 210 and a page buffer 220.

The device interface 400 may be a functional block for exchanging data or signals with the host 20 (or a host interface included in the host 20). The device interface 400 may be connected to the host interface via a standard interface, such as UFS, SATA, SCSI, SAS, and eMMC. The device interface 400 may include a plurality of layers, such as a PHY layer 410, a link layer 420, and a transport layer 430. The PHY layer 410 is a physical layer and may support the MIPI MPHY protocol. The link layer 420 is an upper layer of the PHY layer 410 and may check validity of data or signals input through the PHY layer 410 and may support the MIPI UniPro protocol. The transport layer 430 is an upper layer of the link layer 420 and may support a UFS transport protocol layer (UTP. The PHY layer 410, the link layer 420, and the transport layer 430 of the device interface 400 may be initialized in response to an IFIC from the host 20 while the storage device 10 is being booted.

The FTL 120 may include information regarding mapping between logical addresses and physical addresses of the non-volatile memory 200. The memory cell array 210 may store data received from the host 20. The memory cell array 210 may be connected to word lines, a string select line, a ground select line, and bit lines and may be connected to the page buffer 220 via the bit lines. Furthermore, the memory cell array 210 may include a plurality of NAND cell strings each including a plurality of memory cells. Each cell string may be connected to a bit line through a string select transistor. The memory cell array 210 may include a plurality of memory blocks, and each of the plurality of memory blocks may include a plurality of pages. Each of the plurality of pages may include a plurality of memory cells. The non-volatile memory 200 may include a 2-dimensional (2D) memory array or a 3-dimensional (3D) memory array.

The 3D memory array includes an active area disposed on a silicon substrate, at least one physical level of memory cell arrays having circuitry formed on or in the substrate, and may be formed in monolithic form. The term "monolithic" may mean that layers of each level that make up the array are stacked directly on top of layers of each lower level of the array.

The 3D memory array may include an active area arranged on a silicon substrate and circuits associated with operation of memory cells, wherein the circuits may be monolithically formed on or in the silicon substrate with at least one physical level of the memory cell arrays. The term "monolithic" may refer to a structure in which circuits are stacked on the layers of lower levels of the memory cell array.

According to an example embodiment, the 3D memory array may include cell strings arranged in a vertical direction, such that at least one memory cell is located above another memory cell. The at least one memory cell may include a charge trap layer. U.S. Pat. Nos. 7,679,133, 8,553,466, 8,654,587, 8,559,235, and U.S. Patent Application Publication No. 2011/0233648 disclose that a 3D memory array includes multiple levels and word lines and/bit lines are shared among the plurality of levels, and are incorporated herein by reference in their entirety. Furthermore, U.S. Patent Application Publication No. 2014-0334232 and U.S. Pat. No. 8,488,381 are incorporated herein by reference in their entirety.

The memory cell array 210 may store first through $n^{th}$ boot data BD1 to BDn. The first through $n^{th}$ boot data BD1 through BDn may include setting information necessary for booting the storage device 10 and requested boot data RBD necessary for the host 20 may be selected from among the first through $n^{th}$ boot data BD1 through BDn.

The page buffer 220 may function as a write driver or a sense amplifier depending on an operation mode. During a write operation, the page buffer 220 may transmit a bit line voltage corresponding to data to be written to a bit line of the memory cell array 210. During a read operation, the page buffer 220 may sense data stored in a selected memory cell through a bit line. The page buffer 220 may latch sensed data and output the same to the outside. According to an example embodiment, the page buffer 220 may store requested boot data RBD read from the memory cell array 210. The page buffer 220 may include at least one memory means. For example, the memory means may be a volatile memory, such as static random access memory (SRAM), dynamic random access memory (DRAM), a latch, a flip-flop, or a register.

The device interface 400 may transmit an IFIC received from the host 20 to the boot data predictor 110. The boot data predictor 110 may predict requested boot data RBD based on the received IFIC and transmit a predicted boot data address RBA corresponding to the requested boot data RBD to the FTL 120. The FTL 120 may translate the boot data address RBA to a physical address of the memory cell array 210 in which the requested boot data RDB are stored. Thereafter, the device controller 100 may issue a requested boot data read command RBRC including various voltage signals for reading out the requested boot data RDB. The requested boot data RBD read from the memory cell array 210 may be stored in the page buffer 220. According to the inventive concept, the operation for reading the requested boot data RBD and storing the requested boot data RBD in the page buffer 220 may be performed during an interface initialization operation between the host 20 and the storage device 10.

Figure 2B:
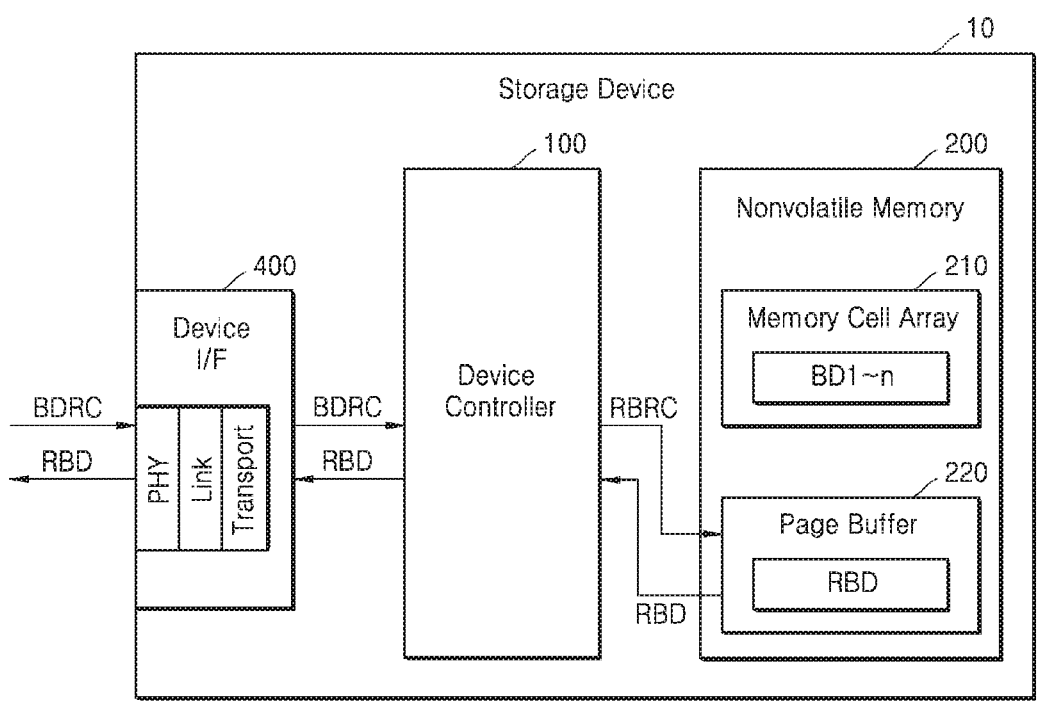
FIG. 2B is a block diagram showing a storage device according to an example embodiment.

FIG. 2B is a block diagram showing a storage device according to an example embodiment. In detail, FIG. 2B is a block diagram showing a storage device when a boot data read command BDRC is received from a host (e.g., the host 20 in FIG. 1).

Referring to FIGS. 1, 2A, and 2B, the storage device 10 may include the device controller 100, the non-volatile memory 200, and the device interface 400. The host 20 may output a boot data read command BDRC to the storage device 10 after an interface initialization is completed. The device controller 100 may receive a boot data read command BDRC via the device interface 400. In correspondence thereto, the device controller 100 may output the requested boot data read command RBRC to the page buffer 220, and thus requested boot data RBD may be read from the page buffer 220 instead of the memory cell array 210. The device controller 100 may output the requested boot data RBD to the host 20 through the device interface 400. Although FIG. 2B shows that the device controller 100 performs the above-stated operations, a CPU (not shown) included in the device controller 100 may actually perform the above-stated operations by controlling a command manager (not shown).

The storage device 10 according to the inventive concept may transfer requested boot data RBD from the memory cell array 210 to the page buffer 220 before an interface initialization is completed and, after the interface initialization is completed, may read the requested boot data RBD from the page buffer 220 in response to a boot data read command BDRC from the host 20 and output the requested boot data RBD to the host 20. As the requested boot data RBD is read from the page buffer 220 instead of from the memory cell array 210, the requested boot data RBD may be read and sent to the host 20 within a shorter time period, and thus the total booting time may be reduced.

Figures 3, 4:
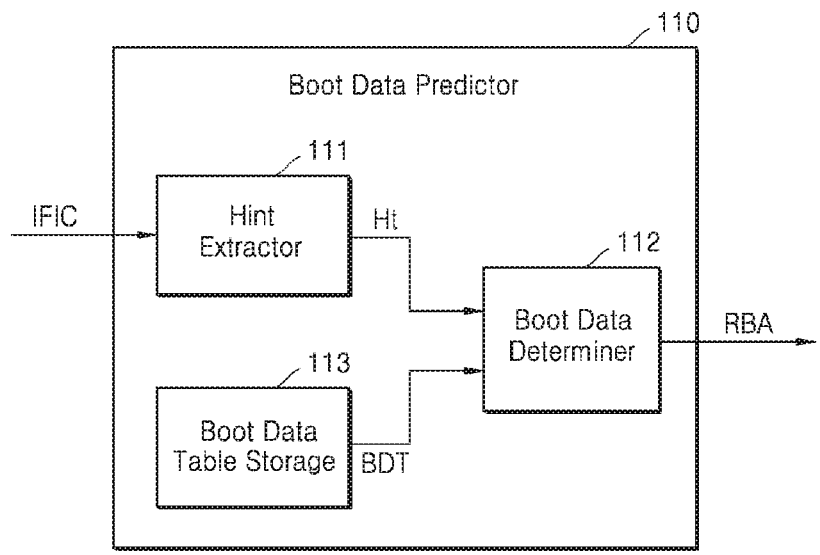
FIG. 3 is a block diagram showing a boot data predictor according to an example embodiment.
FIG. 4 is a table showing an example of a boot data table according to an example embodiment.

FIG. 3 is a block diagram showing a boot data predictor according to an example embodiment.

Referring to FIG. 3, the boot data predictor 110 may include a hint extractor 111, a boot data determiner 112, and a boot data table storage 113. The hint extractor 111 may receive an IFIC from a host (e.g., the host 20 of FIG. 1) and generate a hint Ht based on the IFIC. As described above, the IFIC may include the hint Ht, which is information regarding requested boot data. The hint extractor 111 may extract the hint Ht included in the IFIC and output the hint Ht to the boot data determiner 112.

For example, the hint Ht may be a data length, and the hint extractor 111 may include a counter for counting the data length. According to the present embodiment, the hint extractor 111 may count continuous data length of the IFIC and output a counted result to the boot data determiner 112 as the hint Ht. The hint also may be a hint packet separate from a data packet, and the hint extractor 111 may include a decoder for decoding the hint packet. According to the present embodiment, the hint extractor 111 may output boot data information generated by decoding the hint packet included in the IFIC to the boot data determiner 112. The hint also may be an additional header of a command, and the hint extractor 111 may include a decoder for decoding the additional header. According to the present embodiment, the hint extractor 111 may output boot data information generated by decoding the additional header of the IFIC to the boot data determiner 112.

The boot data table storage 113 may store a boot data table BDT including information matching the hint Ht to a boot data address RBA. The boot data determiner 112 may obtain the boot data table BDT by accessing the boot data table storage 113. The boot data table storage 113 may include one or more memories for storing the boot data table BDT. The one or more memories may be a volatile memory such as SRAM, DRAM, a latch, a flip-flop, or a register, or a non-volatile memory such as a NAND flash memory, a vertical NAND (VNAND) flash memory, a NOR flash memory, resistive random-access memory (RRAM), phase change random-access memory (PRAM), magnetoresistive random-access memory (MRAM), ferroelectric random-access memory (FRAM), or spin-transfer torque random-access memory (STT-RAM).

The boot data determiner 112 may output requested boot data address RBA to an FTL (e.g., the FTL 120 of FIG. 2A) based on the hint Ht and the boot data table BDT. The boot data determiner 112 may output a boot data address corresponding to the hint Ht matched from the boot data table BDT to the FTL as the requested boot data address RBA. FIG. 4 is a table showing an example of a boot data table according to an example embodiment.

Referring to FIGS. 3 and 4, the boot data table BDT may include information regarding a correspondence between hints Ht and boot data addresses. Referring to the boot data table BDT, a first hint Ht1 may correspond to a first boot data address BDA1, a second hint Ht2 may correspond to a second boot data address BDA2, and a third hint Ht3 may correspond to a third boot data address BDA3. According to an example embodiment, when the boot data determiner 112 receives the first hint Ht1 from the hint extractor 111, the boot data determiner 112 may output the first boot data address BDA1 as the requested boot data address RBA. Similarly, when the boot data determiner 112 receives the second hint Ht2 from the hint extractor 111, the boot data determiner 112 may output the second boot data address BDA2 as the requested boot data address RBA. When the boot data determiner 112 receives the third hint Ht3 from the hint extractor 111, the boot data determiner 112 may output the third boot data address BDA3 as the requested boot data address RBA.

Although FIG. 4 shows an example in which three pieces of boot data, three hints Ht, and three boot data addresses are provided, it is merely an example, and it should be understood that the inventive concept is also applicable for less than or more than three pieces of boot data.

FIG. 5 is a diagram showing a method of operating components of a storage system according to an example embodiment.

Referring to FIGS. 1, 2A, and 5, the storage system 1 may include the host 20, the boot data predictor 110, the memory cell array 210, the page buffer 220, and the device interface 400. The host 20 may transmit an IFIC to the boot data predictor 110 through the device interface 400 during an interface initialization T110 for booting the storage device 10 (operation T111). The storage device 10 may enter an interface initialization mode for performing the interface initialization T110 based on the IFIC. The IFIC may include at least one of a PHY layer initialize command, a link layer initialize command, and a transport layer initialize command.

The boot data predictor 110 may predict the requested boot data RBD from among a plurality of pieces of boot data based on a hint included in the IFIC (operation T120). According to an example embodiment, the boot data predictor 110 may predict requested boot data RBD with reference to a boot data table. The boot data predictor 110 may read the requested boot data RBD from the memory cell array 210 by using a requested boot data address RBA corresponding to the predicted requested boot data RBD (operation T130). The requested boot data RBD may be temporarily stored in the page buffer 220 (operation T140).

While the boot data predictor 110, the page buffer 220 and the memory cell array 210 are performing operations T120 through T140, the host 20 and the device interface 400 may perform the interface initialization (operation T110). The interface initialization may include an initialization of the PHY layer 410, an initialization of the link layer 420, and an initialization of the transport layer 430. The storage device 10 may terminate the interface initialization mode after the interface initialization is completed. The host 20 may transmit a boot data read command BDRC to the page buffer 220 through the device interface 400 after the interface initialization is completed (operation T150). In detail, the host 20 may output the boot data read command BDRC to the device controller 100, and the device controller 100 may output a requested boot data read command RBRC to the page buffer 220.

The page buffer 220 may transmit the requested boot data RBD to the host 20 through the device interface 400 (operation T160). In detail, the device controller 100 may read the requested boot data RBD from the page buffer 220 and transmit the requested boot data RBD to the host 20.

Figure 6A:
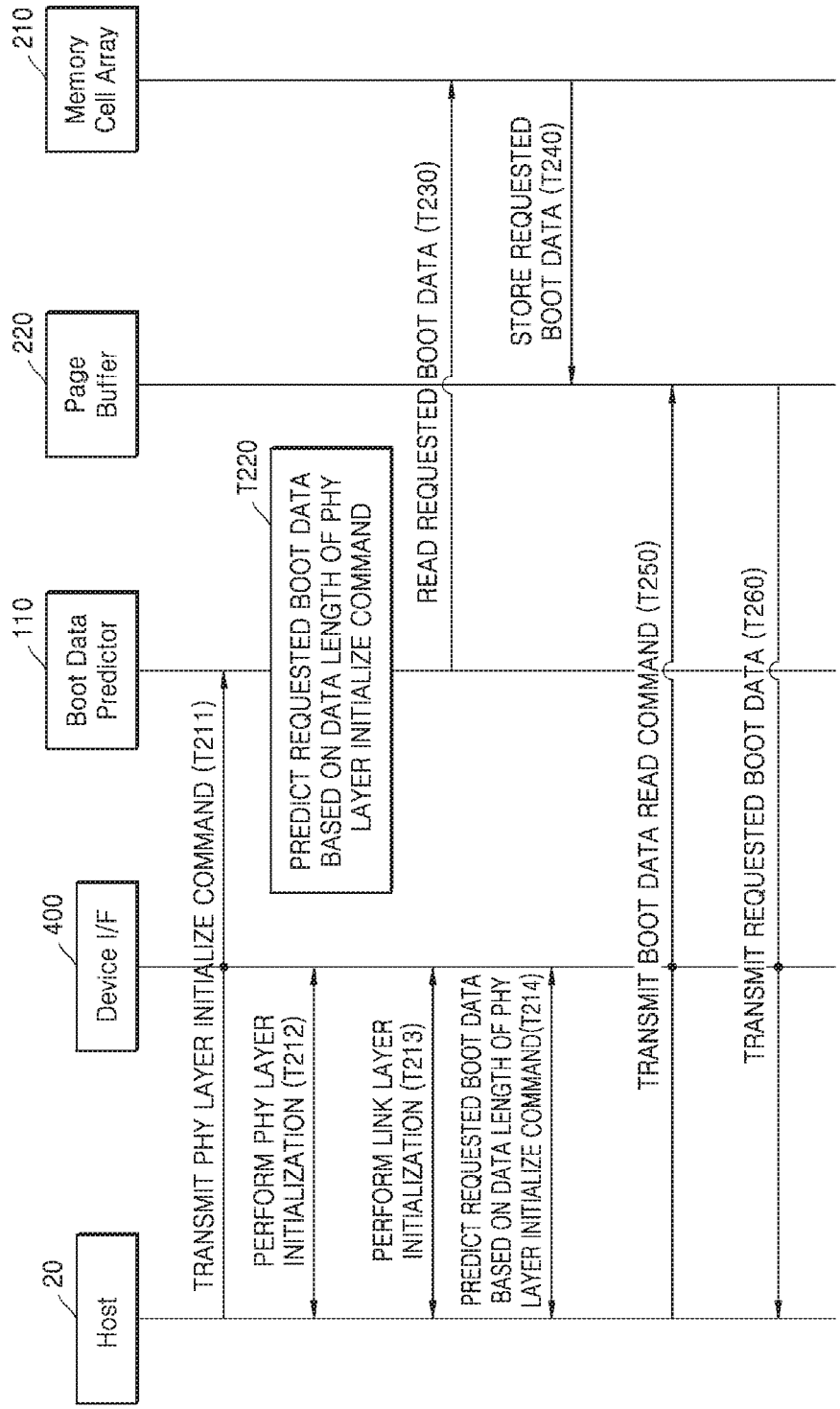
FIG. 6A is a diagram showing a method of operating components of a storage system according to an example embodiment.

FIG. 6A is a diagram showing a method of operating components of a storage system according to an example embodiment according to time. In detail, FIG. 6A is a diagram showing a case in which the boot data predictor 110 predicts requested boot data in response to a PHY layer initialize command from the host 20.

Referring to FIGS. 1, 2A, and 6A, the storage system 1 may include the host 20, the boot data predictor 110, the memory cell array 210, the page buffer 220, and the device interface 400. The host 20 may transmit a PHY layer initialize command to the boot data predictor 110 through the device interface 400 to boot the storage device 10 (operation T211).

The boot data predictor 110 may predict requested boot data RBD from among a plurality of pieces of boot data based on a hint included in the PHY layer initialize command. In detail, the boot data predictor 110 may predict the requested boot data RBD based on the data length of the PHY layer initialize command (operation T220). For example, the boot data predictor 110 may include a counter, which may predict the requested boot data RBD by counting the data length of the PHY layer initialize command. FIG. 6A shows an embodiment that the boot data predictor 110 predicts the requested boot data RBD based on the data length of the PHY layer initialize command. However, the inventive concept is not limited thereto and is also applicable to an embodiment in which the boot data predictor 110 predicts requested boot data RBD based on a hint included in the header of a PHY layer initialize command or a hint packet included in a PHY layer initialize command as described above.

The boot data predictor 110 may read requested boot data RBD from the memory cell array 210 by using a requested boot data address RBA corresponding to the predicted requested boot data RBD (operation T230). The requested boot data RBD may be temporarily stored in the page buffer 220 (operation T240).

While the boot data predictor 110, the page buffer 220 and the memory cell array 210 are performing operations T220 through T240, the host 20 and the device interface 400 may perform a PHY layer initialization (operation T212), a link layer initialization (operation T213), and a transport layer initialization (operation T214). Since an interface initialization is obvious to one of ordinary skill in the art, detailed description thereof will be omitted.

The host 20 may transmit a boot data read command BDRC to the page buffer 220 through the device interface 400 after the interface initialization is completed (operation T250). In detail, the host 20 may output the boot data read command BDRC to the device controller 100, and the device controller 100 may output a requested boot data read command RBRC to the page buffer 220 in response thereto. The page buffer 220 may transmit the requested boot data RBD to the host 20 through the device interface 400 (operation T260). In detail, the device controller 100 may read the requested boot data RBD from the page buffer 220 and transmit the requested boot data RBD to the host 20.

Figure 6B:
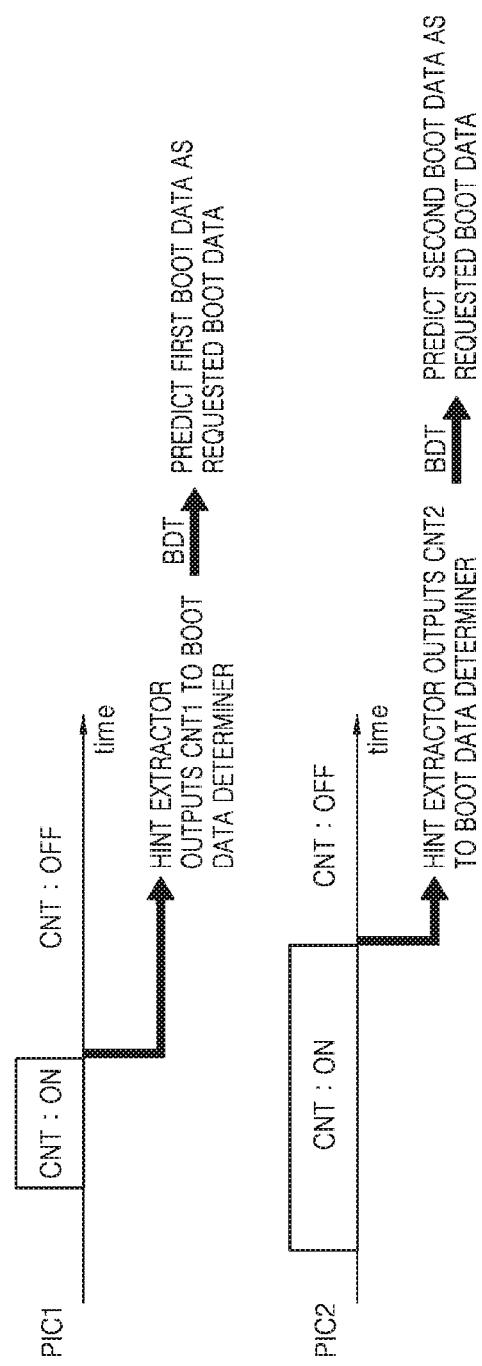
FIG. 6B is a diagram showing an example of an operation for predicting requested boot data according to an example embodiment.

FIG. 6B is a diagram showing an example of an operation for predicting requested boot data according to an example embodiment. In detail, FIG. 6B is a diagram showing an example of prediction of requested boot data based on a data length of a PHY layer initialize command included in an IFIC. Furthermore, FIG. 6B may be a diagram showing operation T220 of FIG. 6A.

Referring to FIGS. 1, 4 and 6B, the IFIC generator 310 generates a PHY layer initialize command including data having different logic high lengths according to requested boot data RBD necessary for a booting process and outputs the PHY layer initialize command to the boot data predictor 110. Therefore, the boot data predictor 110 may receive a first PHY layer initialize command PIC1 or a second PHY layer initialize command PIC2 having different logic high lengths.

When the boot data predictor 110 receives the first PHY layer initialize command PIC1, the hint extractor 111 may count the data length of the logic high of the first PHY layer initialize command PIC1. To this end, the hint extractor 111 may include a counter. The hint extractor 111 may output a first count CNT1 as a result of counting the data length of the logic high of the first PHY layer initialize command PIC1 to the boot data determiner 112. According to an example embodiment, the boot data determiner 112 may search for first boot data corresponding to the first count CNT1 in a boot data table BDT received from the boot data table storage 113 and predicts found first boot data as requested boot data RBD. The boot data determiner 112 may output an address corresponding to the first boot data to an FTL, for example, as a requested boot data address RBA.

According to another example embodiment, the boot data determiner 112 may compare the first count CNT1 with a pre-set reference count and predict requested boot data RBD based on a result of the comparison. For example, when the first count CNT1 is less than the pre-set reference count, the first boot data may be predicted as the requested boot data RBD and, when the first count CNT1 is greater than the pre-set reference count, the second boot data may be predicted as the requested boot data RBD.

When the boot data predictor 110 receives the second PHY layer initialize command PIC2, the hint extractor 111 may count the data length of the logic high of the second PHY layer initialize command PIC2 and output a second count CNT2 to the boot data determiner 112. Since the data lengths of the logic highs of the first PHY layer initialize command PIC1 and the second PHY layer initialize command PIC are different from each other, the first count CNT1 and the second count CNT2 may have different values. The boot data determiner 112 may search for second boot data corresponding to the second count CNT2 from the boot data table BDT received from the boot data table storage 113 and predict found second boot data as the requested boot data RBD. The boot data determiner 112 may output an address corresponding to the second boot data to an FTL as a requested boot data address RBA.

Although FIG. 6B shows an embodiment in which the hint extractor 111 counts data length of logic high of a PHY layer initialize command, it should be understood that the inventive concept is not limited thereto and is applicable to an embodiment in which data length of logic low is counted. Furthermore, although FIG. 6B shows a case where an IFIC is a PHY layer initialize command, the present embodiment for predicting requested boot data RBD by counting a data length is also applicable to a case where the IFIC is a link layer initialize command or a transport layer initialize command.

Figure 7A:
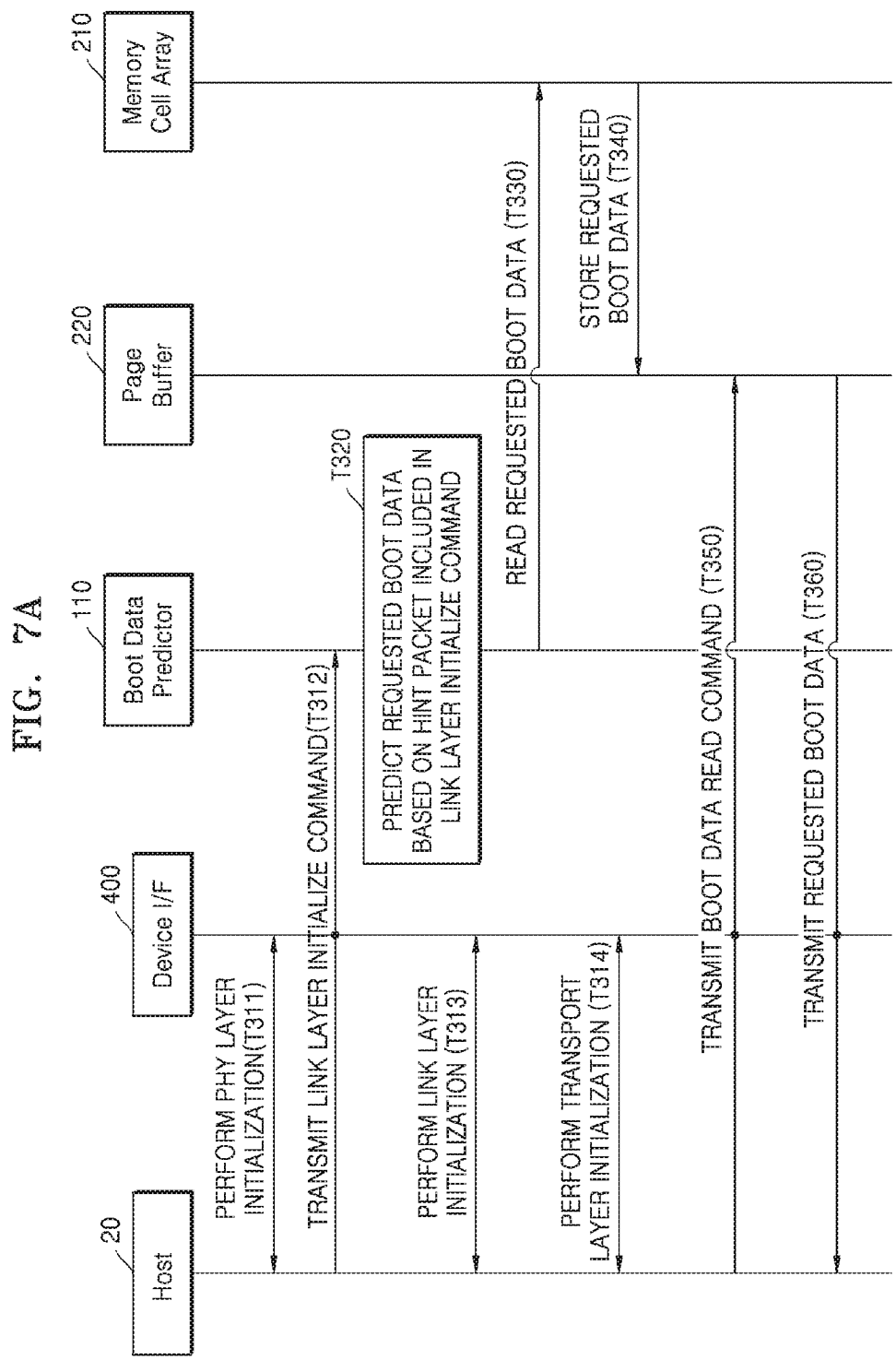
FIG. 7A is a diagram showing a method of operating components of a storage system according to an example embodiment.

FIG. 7A is a diagram showing a method of operating components of a storage system according to an example embodiment according to time. FIG. 7A is a diagram showing a case where the boot data predictor 110 predicts requested boot data in response to a link layer initialize command from the host 20.

Referring to FIGS. 1, 2A, and 7A, the storage system 1 may include the host 20, the boot data predictor 110, the memory cell array 210, the page buffer 220, and the device interface 400. After a PHY layer initialization (operation T311), the host 20 may transmit a link layer initialize command to the boot data predictor 110 through the device interface 400 (operation T312).

The boot data predictor 110 may predict requested boot data RBD from among a plurality of pieces of boot data based on a hint included in the link layer initialize command. In detail, the boot data predictor 110 may predict the requested boot data RBD based on a hint packet included in the link layer initialize command (operation T320). For example, the boot data predictor 110 may include a decoder and may predict the requested boot data RBD as the decoder decodes the hint packet. Although FIG. 7A shows an embodiment in which the boot data predictor 110 predicts requested boot data RBD based on a hint packet included in a link layer initialize command, the inventive concept is not limited thereto and is also applicable to an embodiment in which the boot data predictor 110 predicts requested boot data RBD based on length of data included in a link layer initialize command or a hint included in the header of a link layer initialize command as described above.

The boot data predictor 110 may read the requested boot data RBD from the memory cell array 210 by using a requested boot data address RBA corresponding to the predicted requested boot data RBD (operation T330). The requested boot data RBD may be temporarily stored in the page buffer 220 (operation T340).

While the boot data predictor 110, the page buffer 220, and the memory cell array 210 are performing operations T320 through T340, the host 20 and the device interface 400 may perform an interface initialization by sequentially performing a link layer initialization (operation T313) and transport layer initialization (operation T314). Since an interface initialization is obvious to one of ordinary skill in the art, detailed description thereof will be omitted.

After the interface initialization (operations T311 through T314) is completed, the host 20 may transmit a boot data read command BDRC to the page buffer 220 through the device interface 400 (operation T350). The page buffer 220 may transmit the requested boot data RBD to the host 20 through the device interface 400 (operation T360).

Figure 7B:
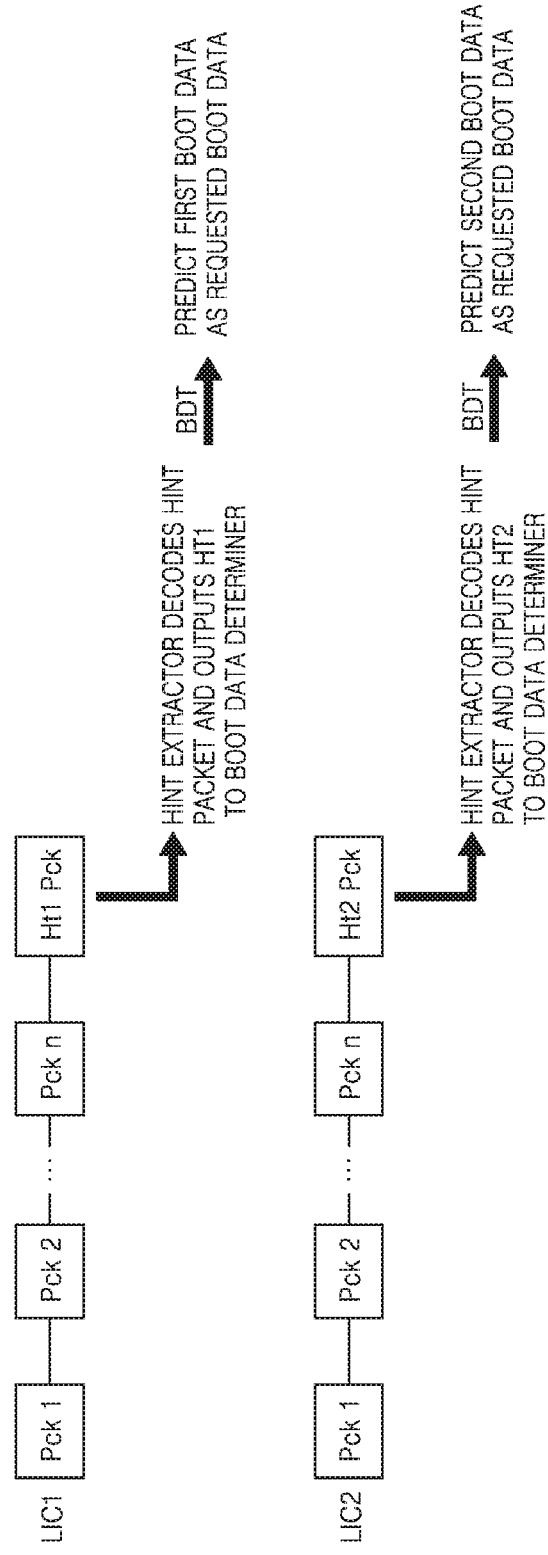
FIG. 7B is a diagram showing an example of an operation for predicting requested boot data according to an example embodiment.

FIG. 7B is a diagram showing an example of an operation for predicting requested boot data according to an example embodiment. In detail, FIG. 7B is a diagram showing an embodiment for predicting requested boot data based on a hint packet included in a link layer initialize command. Furthermore, FIG. 7B may be a diagram showing operation T320 of FIG. 7A.

Referring to FIGS. 1, 4, and 7B, the IFIC generator 310 may generate a link layer initialize command including different hint packets depending on requested boot data RBD necessary for a booting process and output the layer initialize command to the boot data predictor 110. Therefore, the boot data predictor 110 may receive a first link layer initialize command LIC1 or a second link layer initialize command LIC2 having different hint packets.

When the boot data predictor 110 receives the first link layer initialize command LIC1 including first through $n^{th}$ data packets Pck1 through Pckn and a first hint packet Ht1 Pck, the hint extractor 111 may decode the first hint packet Ht1 Pck included in the first link layer initialize command LIC1. To this end, the hint extractor 111 may include a decoder. The hint extractor 111 may output a first hint Ht1 as a result of decoding the first hint packet Ht1 Pck to the boot data determiner 112. The first hint Ht1 may include information regarding first boot data, such as an address of the first boot data, a pre-set indicator indicating the first boot data, etc.

For example, when the first hint Ht1 is an address of the first boot data, the boot data determiner 112 may output the address of the first boot data included in the first hint Ht1 to an FTL as a requested boot data address RBA.

In another example, when the first hint Ht1 is a pre-set indicator indicating the first boot data, the boot data determiner 112 may search for first boot data corresponding to the first hint Ht1 in a boot data table BDT received from the boot data table storage 113 and predict found first boot data as requested boot data RBD. The boot data determiner 112 may output an address corresponding to the first boot data to the FTL as the requested boot data address RBA.

Similarly, when the boot data predictor 110 receives the second link layer initialize command LIC2 including a second hint packet Ht2 Pck, the hint extractor 111 may decode the second hint packet Ht2 Pck included in the second link layer initialize command LIC2. Since the second hint packet Ht2 Pck is different from the first hint packet Ht1 Pck, the hint extractor 111 may extract different hints as a result of decoding the first hint packet Ht1 Pck and the second hint packet Ht1 Pck. The hint extractor 111 may output a second hint Ht2 as a result of decoding the second hint packet Ht2 Pck to the boot data determiner 112. The second hint Ht2 may include information regarding the second boot data, such as an address of the second boot data, a pre-set indicator indicating the second boot data, etc.

Although FIG. 7B shows a case where the IFIC is a link layer initialize command, the inventive concept is not limited thereto and is also applicable to a case where the IFIC is a PHY layer initialize command or a transport layer initialize command including a hint packet.

Figure 8A:
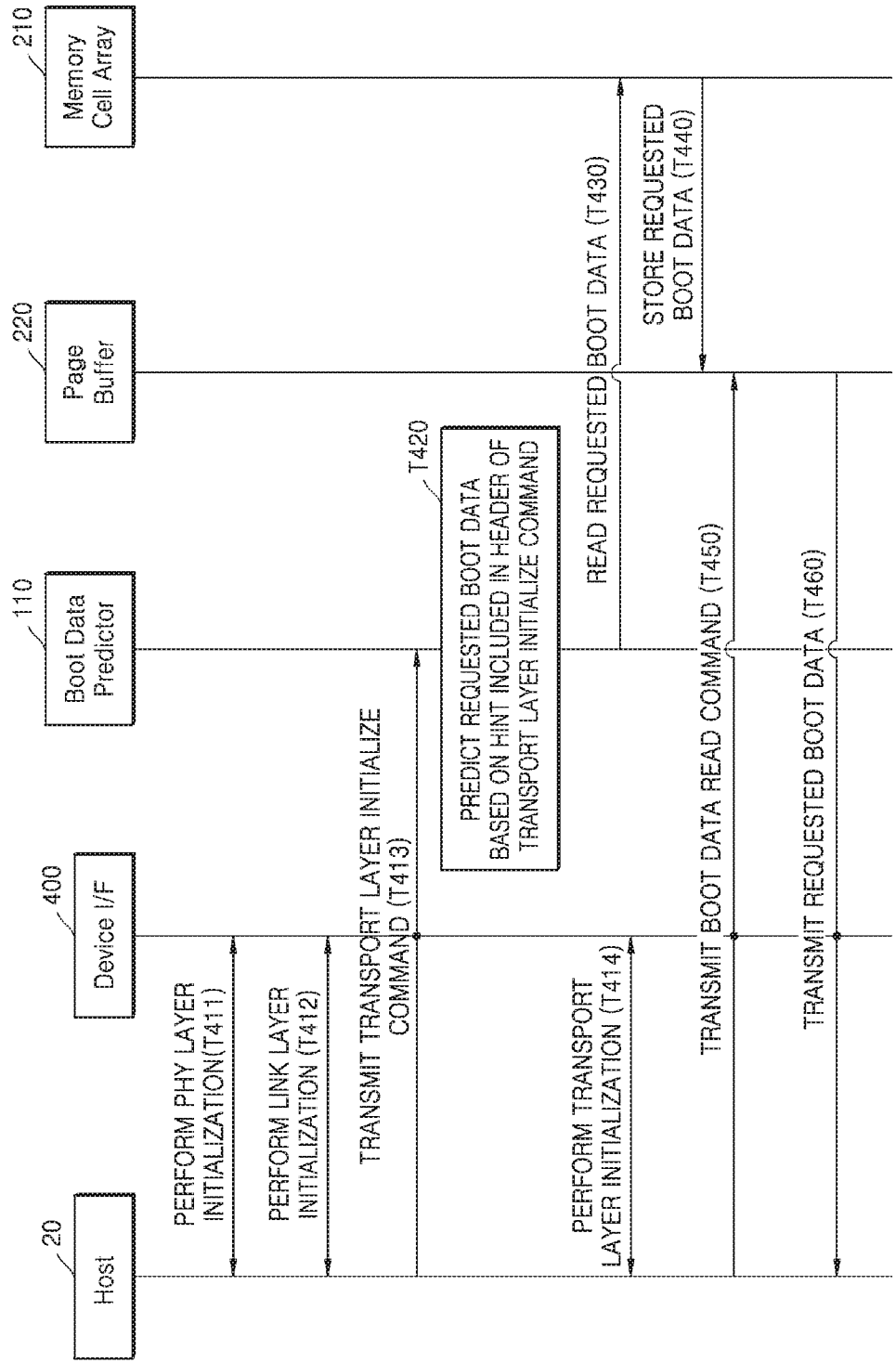
FIG. 8A is a diagram showing a method of operating components of a storage system according to an example embodiment.

FIG. 8A is a diagram showing a method of operating components of a storage system according to an example embodiment according to time. In detail, FIG. 8A is a diagram showing a case where the boot data predictor 110 predicts requested boot data in response to a transport layer initialize command from the host 20. Referring to FIGS. 1, 2A, and 8A, the storage system 1 may include the host 20, the boot data predictor 110, the memory cell array 210, the page buffer 220, and the device interface 400. After performing a PHY layer initialization (operation T411) and a link layer initialization (operation T412), the host 20 may transmit a transport layer initialize command to the boot data predictor 110 via the device interface 400 (operation T413).

The boot data predictor 110 may predict the requested boot data RBD from among a plurality of pieces of boot data based on a hint included in the transport layer initialize command. In detail, the boot data predictor 110 may predict the requested boot data RBD based on the hint included in the header of the transport layer initialize command (operation T420). For example, the boot data predictor 110 may include a decoder, and the requested boot data RBD may be predicted as the decoder decodes the header of the transport layer initialize command. For example, the length of the header of the transport layer initialize command may be adjusted, and an added header may include a hint.

Although FIG. 8A shows an embodiment in which the boot data predictor 110 predicts requested boot data RBD based on the header included in a transport layer initialize command, it should be understood that the inventive concept is not limited thereto and the boot data predictor 110 is also applicable to an embodiment in which the boot data predictor 110 predicts requested boot data RBD based on a hint packet included in the transport layer initialize command or data length of the transport layer initialize command as described above.

The boot data predictor 110 may read requested boot data RBD from the memory cell array 210 by using a requested boot data address RBA corresponding to the predicted requested boot data RBD (operation T430). The requested boot data RBD may be temporarily stored in the page buffer 220 (operation T440).

While the boot data predictor 110, the page buffer 220, and the memory cell array 210 are performing operations T420 through T440, the host 20 and the device interface 400 may complete an interface initialization by performing a transport layer initialization (operation T414). Since an interface initialization is obvious to one of ordinary skill in the art, detailed description thereof will be omitted.

After the interface initialization (operations T411 through T414) is completed, the host 20 may transmit a boot data read command BDRC to the page buffer 220 through the device interface 400 (operation T450). The page buffer 220 may transmit the requested boot data RBD to the host 20 through the device interface 400 (operation T460).

Figure 8B:
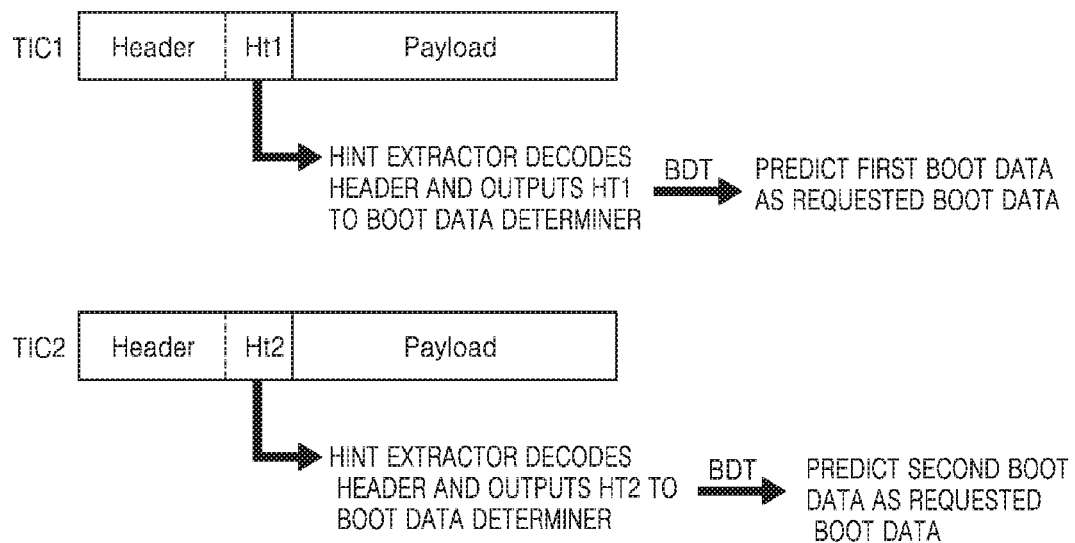
FIG. 8B is a diagram showing an example of an operation for predicting requested boot data according to an example embodiment.

FIG. 8B is a diagram showing an example of an operation for predicting requested boot data according to an example embodiment. In detail, FIG. 8B is a diagram showing an example of predicting requested boot data based on a hint included in the header of a transport layer initialize command. Furthermore, FIG. 8B may be a diagram showing operation T420 of FIG. 8A.

Referring to FIGS. 1, 4, and 8B, the IFIC generator 310 may generate a transport layer initialization command including different hints in the header depending on requested boot data RBD necessary for a booting process and output the transport layer initialize command to the boot data predictor 110. Therefore, the boot data predictor 110 may receive a first transport layer initialize command TIC1 or a second transport layer initialize command TIC2 having different hint packets.

The first transport layer initialize command TIC1 and the second transport layer initialize command TIC2 may each include a header and a payload. The header may include configuration information, such as encoding information and command type information regarding the first transport layer initialize command TIC1 and the second transport layer initialize command TIC2, and the payload may include actual information, such as command contents of the first transport layer initialize command TIC1 and the second transport layer initialize command TIC2 command. According to an example embodiment, the header may include a hint. According to another example embodiment, the header may be set to be extensible, and an extended additional header may include a hint.

When the boot data predictor 110 receives the first transport layer initialize command TIC1 including a first hint Ht1 in the header, the hint extractor 111 may extract the first hint Ht1 by decoding the header of the first transport layer initialize command TIC1. To this end, the hint extractor 111 may include a decoder. The hint extractor 111 may output the first hint Ht1 to the boot data determiner 112. The first hint Ht1 may include information regarding first boot data, such as an address of the first boot data, a pre-set indicator indicating the first boot data, etc.

For example, when the first hint Ht1 is an address of the first boot data, the boot data determiner 112 may output the address of the first boot data included in the first hint Ht1 as the requested boot data address RBA to an FTL.

In another example, when the first hint Ht1 is a pre-set indicator indicating the first boot data, the boot data determiner 112 may search for first boot data corresponding to the first hint Ht1 in a boot data table BDT received from the boot data table storage 113 and predict found first boot data as requested boot data RBD. The boot data determiner 112 may output an address corresponding to the first boot data to the FTL as a requested boot data address RBA.

Similarly, when the boot data predictor 110 receives the second transport layer initialize command TIC2 including a second hint Ht2 in the header, the hint extractor 111 may extract the second hint Ht2 by decoding the header of the second transport layer initialize command TIC2. The hint extractor 111 may output the second hint Ht2 to the boot data determiner 112. The second hint Ht2 may include information regarding second boot data, such as an address of the second boot data, a pre-set indicator indicating the second boot data, etc.

Although FIG. 8B shows a case where the IFIC is a transport layer initialize command, the inventive concept is not limited thereto, and the present embodiment is also applicable to a case where the header of an IFIC is a PHY layer initialize command or a link layer initialize command including a hint.

Figure 9:
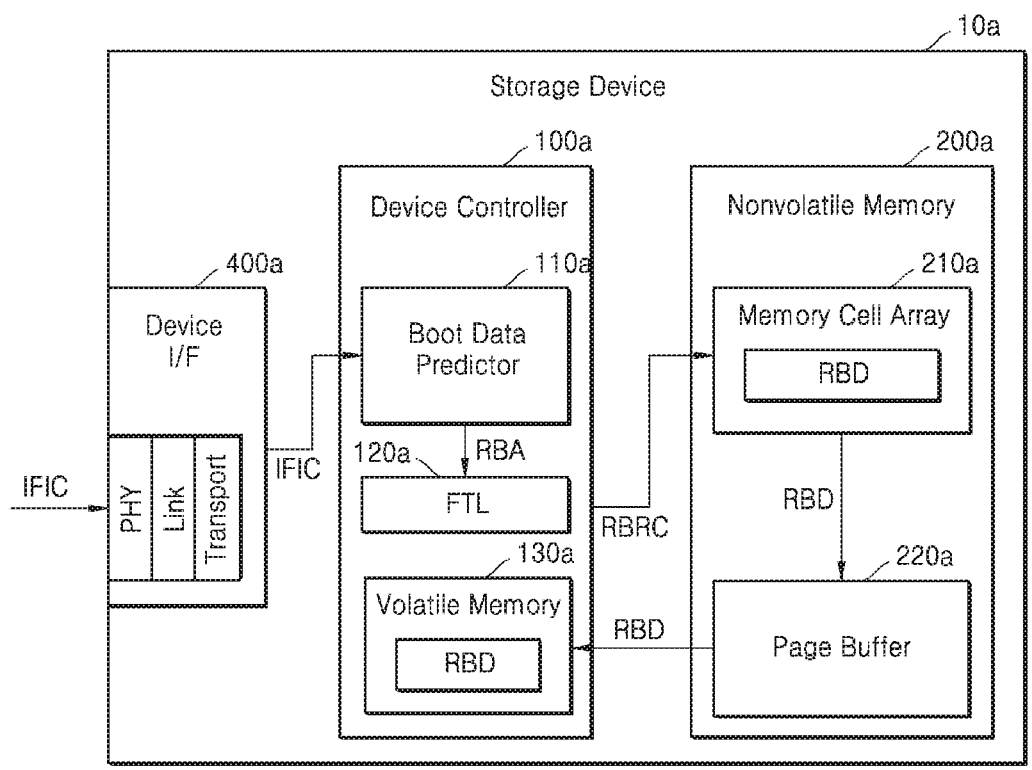
FIG. 9 is a block diagram showing a storage device according to an example embodiment.

FIG. 9 is a block diagram showing a storage device according to an example embodiment. In detail, FIG. 9 is a block diagram showing an embodiment in which requested boot data is stored in a volatile memory included in a device controller.

Referring to FIG. 9, a storage device 10*a* may include a device controller 100*a*, a non-volatile memory 200*a*, and a device interface 400*a*. The device controller 100*a* may include a boot data predictor 110*a*, an FTL 120*a*, and a volatile memory 130*a*. The non-volatile memory 200*a* may include a memory cell array 210*a* and a page buffer 220*a*. The boot data predictor 110*a*, the FTL 120*a*, the memory cell array 210*a*, and the device interface 400*a* may be identical or similar to the boot data predictor 110, the FTL 120, the memory cell array 210, and the device interface 400 of FIG. 2A, respectively.

The volatile memory 130*a* included in the device controller 100*a* may temporarily store requested boot data RBD. Because the volatile memory 130*a* may perform data input/output operations at a higher speed than the non-volatile memory 200*a*, the storage device may output the requested boot data RBD fast in response to the boot data read command. The volatile memory 130*a* may include, for example, SRAM, DRAM, a latch, a flip-flop, and a register. For example, the volatile memory 130*a* may be implemented as a buffer included in the device controller 100*a*.

The device interface 400*a* may output an IFIC received from a host (e.g., the host 20 in FIG. 2A) to the boot data predictor 110*a*. The boot data predictor 110*a* may predict requested boot data RBD based on the IFIC and output the predicted requested boot data address RBA of the requested boot data RBD to the FTL 120*a*. The FTL 120*a* may output a requested boot data read command RBRC including various voltage signals to the memory cell array 210*a*. Therefore, the requested boot data RBD read from the memory cell array 210*a* may be stored in the volatile memory 130*a* through the page buffer 220*a*. Furthermore, after an interface initialization is completed, the volatile memory 130*a* may output the requested boot data RBD to the host in response to a boot data read command BDRC received from the host, under the control of the device controller 100*a*.

Although FIG. 9 shows that the volatile memory 130*a* is located inside the device controller 100*a*, the inventive concept is not limited thereto, and the volatile memory 130*a* may be located outside the device controller 100*a*. It should be understood that the inventive concept is also applicable to a case where the volatile memory 130*a* is located outside the device controller 100*a*.

Figure 10:
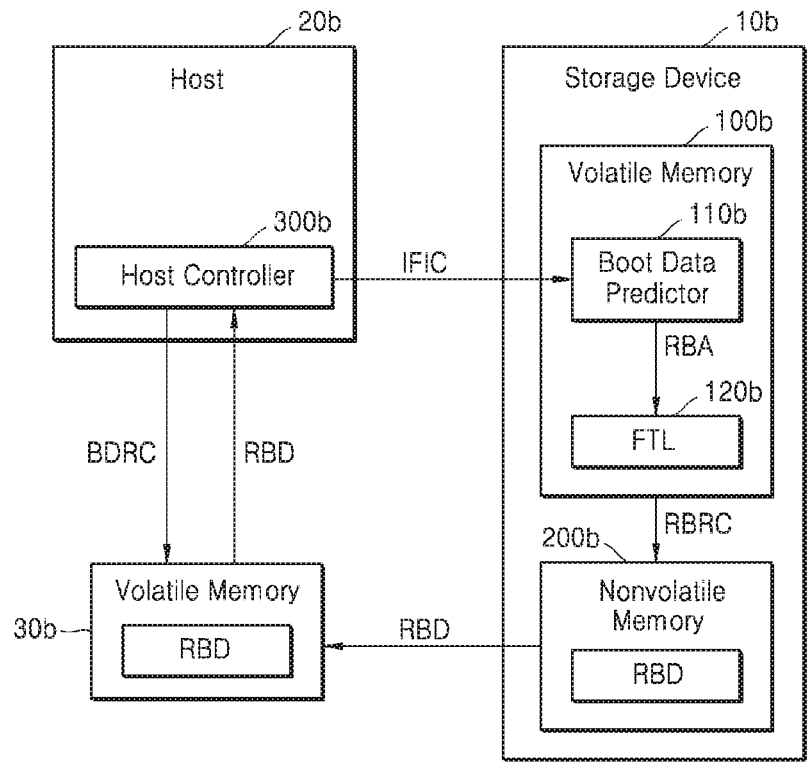
FIG. 10 is a block diagram showing a storage system according to an example embodiment.

FIG. 10 is a block diagram showing a storage system according to an example embodiment. In detail, FIG. 10 is a block diagram showing an embodiment in which requested boot data is stored in a volatile memory outside a storage device.

Referring to FIG. 10, a storage system 1*b* may include a storage device 10*b*, a host 20*b*, and a volatile memory 30*b*. The storage device 10*b* may include a non-volatile memory 200*b* and a device controller 100*b* including a boot data predictor 110*b* and an FTL 120*b*. The host 20*b* may include a host controller 300*b*. The boot data predictor 110*b*, the FTL 120*b*, the non-volatile memory 200*b*, and the host controller 300*b* are identical or similar to the boot data predictor 110, the FTL 120, the non-volatile memory 200, and the host controller 300 of FIGS. 1A and 2, respectively.

The volatile memory 30*b* may temporarily store requested boot data RBD. The volatile memory 30*b* may perform data input/output operations at a higher speed than the non-volatile memory 200*b*. The volatile memory 30*b* may include, for example, SRAM, DRAM, a latch, a flip-flop, or a register. For example, the volatile memory 30*b* may be included in the host 20*b*.

The host controller 300*b* may generate an IFIC including information regarding requested boot data RBD and output the IFIC to the boot data predictor 110*b*. The boot data predictor 110*b* may predict the requested boot data RBD based on the IFIC and output a requested boot data address RBA corresponding to the requested boot data RBD to the FTL 120*b*. The FTL 120*b* may read the requested boot data RBD by outputting a boot data read command RBRC to the non-volatile memory 200*b* based on the received requested boot data address RBA and write the requested boot data RBD to the volatile memory 30*b* outside the storage device 10*b*. Furthermore, after an interface initialization is completed, the host controller 300*b* may output the boot data read command BDRC to the volatile memory 30*b* instead of the storage device 10*b*, and the volatile memory 30*b* may output the requested boot data RBD stored therein to the host 20*b* in response to the received boot data read command BDRC.

Although FIG. 10 shows that the requested boot data RBD is stored in the volatile memory 30*b*, it should be understood that the inventive concept is not limited thereto and is also applicable to an embodiment in which requested boot data RBD is predicted in advance and stored in a non-volatile memory outside the storage device 10*b*.

Figure 11:
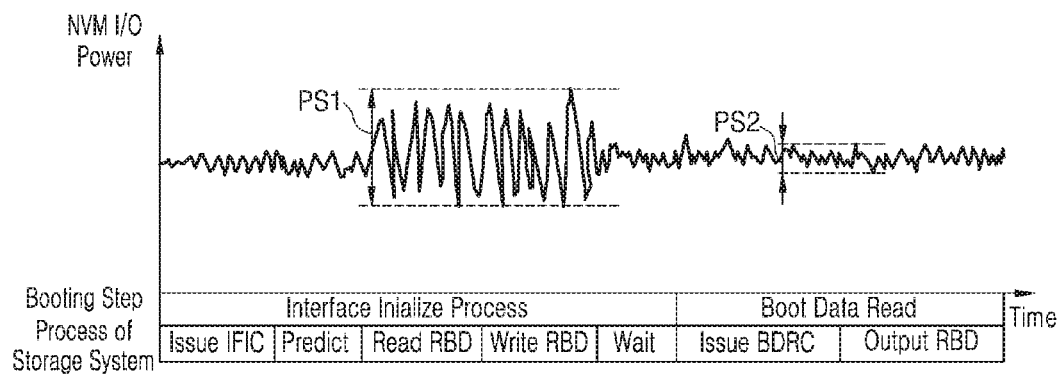
FIG. 11 is a graph showing data I/O voltage levels of a non-volatile memory for respective operation stages according to an example embodiment.

FIG. 11 is a graph showing data I/O voltage levels of a non-volatile memory for respective operation stages according to an example embodiment. In detail, FIG. 11 is a graph showing data I/O voltage levels of a device controller and a non-volatile memory for respective operation stages. In FIG. 11, the horizontal axis represents the operation stages according to time, and the vertical axis represents data I/O levels of the non-volatile memory.

Referring to FIGS. 1, 2A, and 11, a booting stage may include an interface initializing stage and a boot data reading stage depending on whether an interface is initialized. The interface initializing stage may refer to an operation stage for performing an interface initialization between the host 20 and the device interface 400. The boot data reading stage may refer to an operation stage in which the host 20 reads boot data from the storage device 10 via a boot data read command BDRC after the interface initialization is completed.

Furthermore, the interface initializing stage includes an interface initialize command issuing stage Issue IFIC in which the host 20 issues an interface initialize command to the device controller 100, a predicting stage Predict in which the device controller 100 predicts requested boot data RBD, a requested boot data reading stage Read RBD in which the device controller 100 reads the requested boot data RBD from the memory cell array 210, a requested boot data writing stage Write RBD for writing the read requested boot data RBD to the page buffer 220, and a waiting stage Wait in which the device controller 100 and the non-volatile memory 200 wait. Furthermore, the boot data reading stage may include a boot data read command issuing stage Issue BDRC in which the host 20 issues a boot data read command BDRC to the device controller 100 and a requested boot data outputting stage Output RBD in which the requested boot data RBD is output to the host 20.

In the interface initializing stage, the data I/O voltage level of the non-volatile memory may have a first maximum power swing level PS1, and the data I/O voltage level of the non-volatile memory may have a second maximum power swing level PS2. According to an example embodiment, the first maximum power swing level PS1 may be higher than the second maximum power swing level PS2.

When there is a data input/output operation with respect to the memory cell array 210, the variation range of the data I/O voltage level of the non-volatile memory may increase. According to the inventive concept, since the device controller 100 reads the requested boot data RBD in the requested boot data reading stage Read RBD before the boot data read command BDRC of the host 20 is received and the read requested boot data RBD is written to the page buffer 220 in the requested boot data writing stage Write RBD, the variation range of the I/O voltage level of the non-volatile memory in the interface initializing stage may be greater than that in the boot data reading stage.

Figure 12:
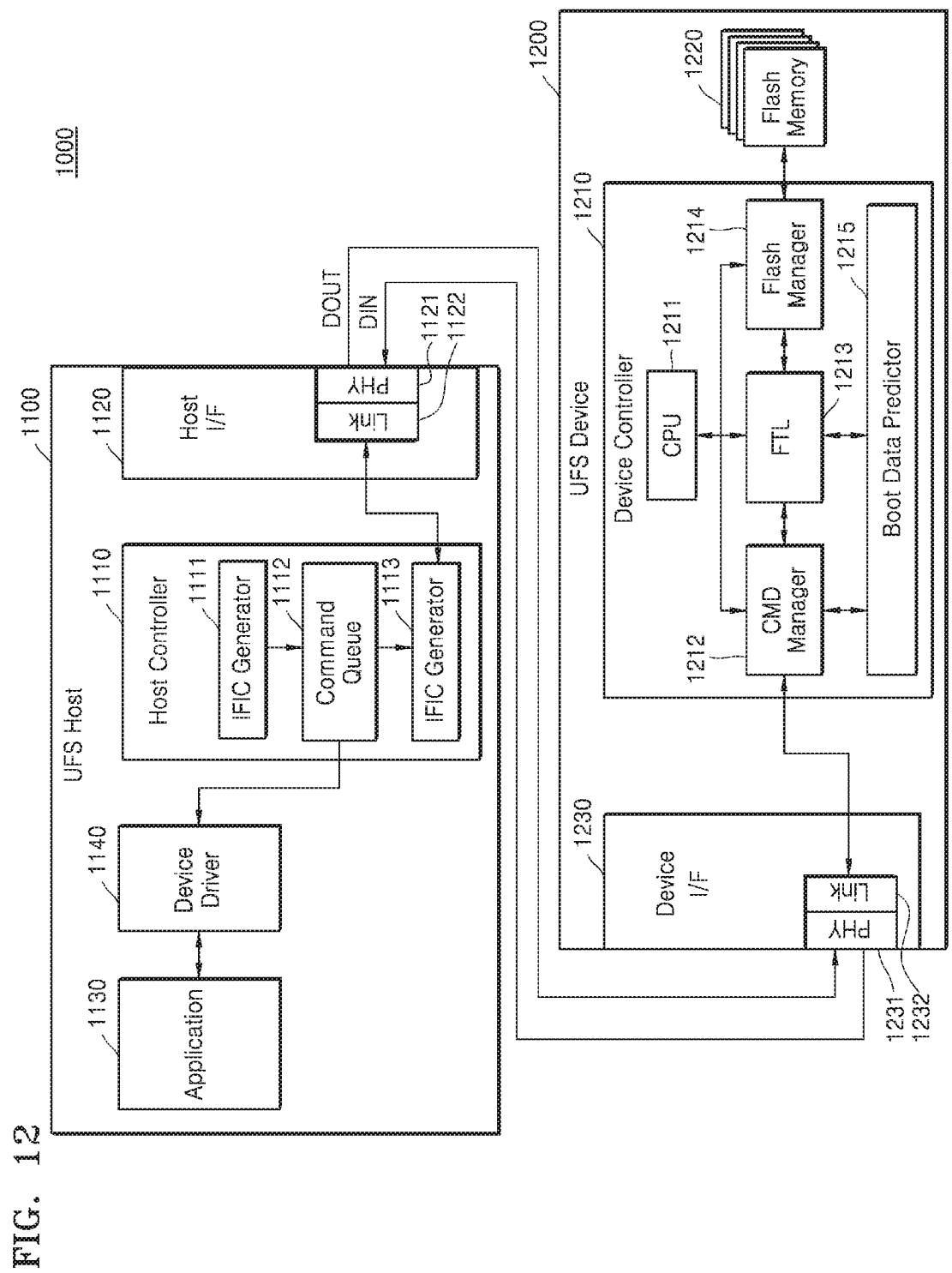
FIG. 12 is a block diagram showing a UFS system according to an example embodiment.

FIG. 12 is a block diagram showing a UFS system according to an example embodiment. Referring to FIG. 12, a UFS system 1000 may include a UFS host 1100 and a UFS device 1200. The UFS host 1100 may include a host controller 1110, a host interface 1120, an application 1130, and a device driver 1140. The host controller 1110 may include an IFIC generator 1111, a command queue 1112, and a host DMA 1113. Since the UFS host 1100 may be an example of the host 20 in FIG. 1, descriptions of the UFS host 1100 identical to the descriptions of the host 20 given above will be omitted.

A command (e.g., a write command) generated by the application 1130 of the UFS host 1100 and the device driver 1140 may be input to the command queue 1112 of the host controller 1110. Furthermore, an IFIC generated by the IFIC generator 1111 may also be input to the command queue 1112. The command queue 1112 stores commands to be provided to the UFS device 1200 in order. Commands stored in the command queue 1112 may be provided to the host DMA 1113. The host DMA 1113 may transmit commands to the UFS device 1200 via the host interface 1120.

The UFS device 1200 may include a device controller 1210, a flash memory 1220, and a device interface 1230. The device controller 440 may also include a CPU 1211, a command manager 1212, an FTL 1213, a flash manager 1214, and a boot data predictor 1215. Since the UFS device 1200 may be an example of the storage device 10 in FIG. 1, descriptions of the UFS device 1200 identical to the descriptions of the storage device 10 given above will be omitted.

Commands input from the UFS host 1100 to the UFS device 1200 may be provided to the command manager 1212 through the device interface 1230. The command and data may be provided to the command manager 1212 via a device DMA (not shown). The UFS device 1200 may provide the provided data to the flash manager 1214, and the flash manager 1214 may refer to address mapping information regarding the FTL 1213 to write the data to a selected address of the flash memory 1220. The UFS device 1200 may transmit a response signal to the UFS host 1100 through the device interface 1230 when data transmission and programming necessary for a command are completed. The UFS host 1100 may notify the device driver 1140 and the application 1130 whether a command corresponding to the received response signal has been completed and terminate an operation regarding the corresponding command. The boot data predictor 1215 may receive an IFIC from the command manager 1212, predict requested boot data RBD, and read the requested boot data RBD from the flash memory 1220 via the FTL 1213 based on an address of the requested boot data RBD.

The host interface 1120 and the device interface 1230 may include link layers 1121 and 1231 and PHY layers 1122 and 1232 as UFS interconnect layers (UIC). The link layers 1121 and 1231 may be MIPI UniPro layers, whereas the PHY layers 1122 and 1232 may be MIPI M-PHY layers. Although not shown, the host interface 1120 and the device interface 1230 may further include transport layers, and the transport layers may be UFS transport protocol (UTP) layers.

Figure 13:
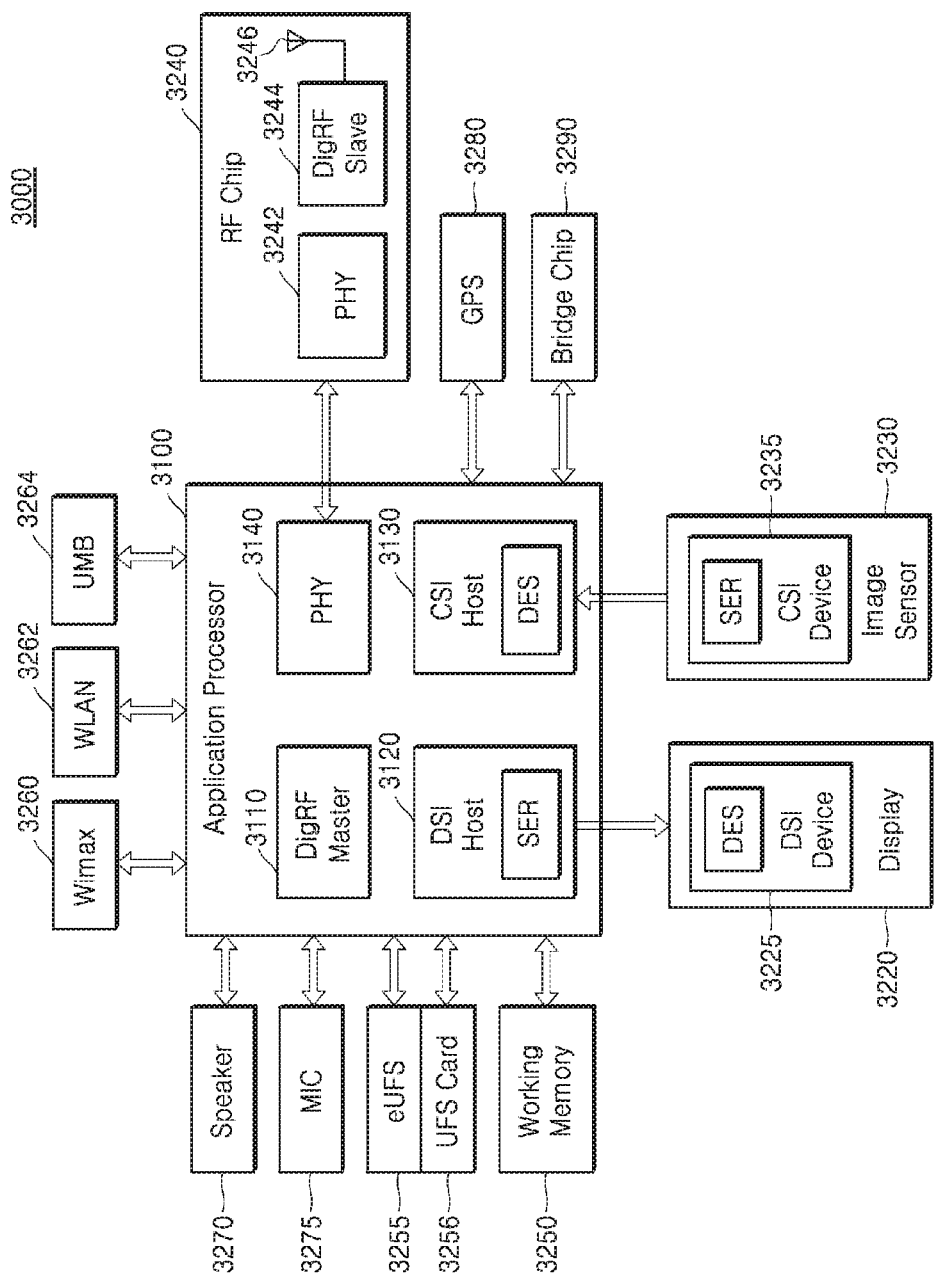
FIG. 13 is a block diagram showing a mobile device according to an example embodiment.

FIG. 13 is a block diagram showing a mobile device according to an example embodiment. A mobile device 3000 may be implemented as a data processing device capable of using or supporting an interface proposed by the MIPI Alliance. For example, the mobile device 3000 may be implemented as a portable communication terminal, a personal digital assistant (PDA), a portable media player (PMP), a smart phone, a tablet PC, or a wearable device.

The mobile device 3000 may include an application processor 3100, a display 3220, and an image sensor 3230. The application processor 3100 may include a DigRF master 3110, a display serial interface (DSI) host 3120, a camera serial interface (CSI) host 3130, and a physical layer 3140. The DSI host 3120 may communicate with the DSI device 3225 of the display 3220 according to the DSI. For example, an optical serializer may be implemented in the DSI host 3120. For example, an optical de-serializer may be implemented in the DSI device 3225. The CSI host 3130 may communicate with the CSI device 3235 of the image sensor 3230 according to the CSI. For example, an optical de-serializer (DES) may be implemented in the CSI host 3130. For example, an optical serializer (SER) may be implemented in the CSI device 3235. The DSI and the CSI may use physical layers and link layers.

The mobile device 3000 may further include a radio frequency (RF) chip 3240 for communicating with the application processor 3100. The RF chip 3240 may include a physical layer 3242, a DigRF slave 3244, and an antenna 3246.

The mobile device 3000 may further include a working memory 3250, an embedded storage device (eUFS) 3255, and a memory card (UFS card) 3256. The working memory 3250, the embedded storage device 3255, and the memory card 3256 may store data provided by the application processor 3100. Furthermore, the working memory 3250, the embedded storage device 3255, and the memory card 3256 may provide data stored therein to the application processor 3100. The working memory 3250 may temporarily store data to be processed by or processed by the application processor 3100. The working memory 3250 may include a volatile memory such as SRAM, DRAM, or SDRAM, or a non-volatile memory, such as a flash memory, PRAM, MRAM, ReRAM, or FRAM.

Each of the embedded storage device 3255 and the memory card 3256 may store data regardless of power supply. For example, the embedded storage device 3255 and the memory card 3256 may operate according to the UFS interface protocol. In particular, each of the embedded storage device 3255 and the memory card 3256 may be configured like the storage device 10, 10a, or 10b described above with reference to FIGS. 1 through 12. Each of the embedded storage device 3255 and the memory card 3256 may reduce a booting time by reading boot data from the flash memory in advance while the application processor 3100 is being booted.

The mobile device 3000 may communicate with an external system through a world interoperability for microwave access (Wimax) 3260, a wireless local area network (WLAN) 3262, or an ultra wideband (UWB) 3264. The mobile device 3000 may further include a speaker 3270 and a microphone 3275 for processing voice data. Furthermore, the mobile device 3000 may further include a global positioning system (GPS) device 3280 for processing positional information. The mobile device 3000 may further include a bridge chip 3290 for managing connection with peripheral devices.

While the inventive concept has been particularly shown and described with reference to embodiments thereof, it will be understood that various changes in form and details may be made therein without departing from the spirit and scope of the following claims.

What is claimed is:

1. A storage device configured to be connected to a host, the storage device comprising:
    a interface comprising a PHY layer, a link layer, and a transport layer;
    a non-volatile memory configured to store at least one piece of boot data for booting the storage device; and
    a device controller configured to,
        initialize the interface between the device controller and the host in response to receiving an interface initialize command (IFIC) from the host,
        predict requested boot data among the at least one piece of boot data stored in the non-volatile memory based on the IFIC,
        control the non-volatile memory to read out the requested boot data, and
        receive a boot data read command from the host after the prediction of the requested boot data and the initialization of the interface are completed, the boot data read command indicating the requested boot data,
    wherein the IFIC is an initialize command which initializes at least one of the PHY layer, the link layer, or the transport layer for communicating with the host,
    wherein the device controller obtains a data length of a PHY layer initialization command by counting a quantity of contiguous logic low bits or a quantity of contiguous logic high bits of data included in the PHY layer initialization command to generate a counted result, and predicts the requested boot data based on the counted result.

2. The storage device of claim 1, wherein the IFIC includes hint data regarding the requested boot data, and
    the device controller is configured to predict the requested boot data based on the hint data included in the IFIC.

3. The storage device of claim 2, wherein the device controller is configured to:
    extract the hint data from the IFIC; and
    determine the requested boot data based on a boot data table and the hint data, the boot data table including the hint data and information regarding boot data corresponding to the hint data.

4. The storage device of claim 2, wherein the device controller is configured to:
    predict the requested boot data by comparing the counted result to a set reference count.

5. The storage device of claim 2, wherein the device controller is configured to:
    obtain the hint data by decoding a hint packet included in the IFIC; and
    predict the requested boot data based on the hint data and a set boot data table.

6. The storage device of claim 2, wherein the device controller is configured to:
    obtain the hint data by decoding a header of the IFIC; and
    predict the requested boot data based on the hint data and a set boot data table.

7. The storage device of claim 1, wherein the non-volatile memory comprises a memory cell array including at least one memory cell and a page buffer connected to the at least one memory cell, and the device controller is configured to,
read the requested boot data from the memory cell array in response to the prediction, and
store the requested boot data in the page buffer.

8. The storage device of claim 7, wherein the page buffer is configured to output the requested boot data to the host in response to the boot data read command.

9. The storage device of claim 1, further comprising:
a volatile memory configured to store the requested boot data,
wherein the device controller is configured to,
read the requested boot data from the non-volatile memory in response to the prediction, and
store the requested boot data in the volatile memory.

10. A method of operating a storage device comprising a non-volatile memory and a volatile memory, the method comprising:
initializing an interface between the storage device and a host in response to receiving an interface initialize command (IFIC) from the host using information included in the IFIC;
reading boot data from the non-volatile memory in response to the IFIC;
storing the boot data in the volatile memory; and
receiving a boot data read command from the host after the storing and the initializing are completed, the boot data read command indicating the boot data and
wherein the interface comprises a PHY layer interface, a link layer interface, and a transport layer interface,
the initializing initializes at least one of the PHY layer interface, the link layer interface, or the transport layer interface, and
wherein the reading boot data from the non-volatile memory in response to the IFIC includes:
obtaining a data length of a PHY layer initialization command by counting a quantity of contiguous logic low bits or a quantity of contiguous logic high bits of data included in the PHY layer initialization command to generate a counted result; and
predicting the boot data based on the counted result.

11. The method of claim 10, further comprising:
outputting the boot data stored in the volatile memory to the host via the interface in response to the receiving a boot data read command,
wherein the receiving receives the boot data read command from the host via the interface.

12. The method of claim 10, wherein the initializing the interface is completed after the storing the boot data in the volatile memory is completed.

13. The method of claim 10, wherein the volatile memory is a page buffer included in the non-volatile memory.

14. The method of claim 10, wherein the reading boot data includes:
reading first boot data corresponding to first hint data in response to determining the IFIC includes the first hint data; and
reading second boot data corresponding to second hint data in response to determining the IFIC includes the second hint data.

15. A storage system comprising:
a host comprising a host controller configured to generate an interface initialize command (IFIC) including hint data regarding requested boot data for booting the storage system and a boot data read command for reading out the requested boot data; and
a storage controller configured to,
initialize an interface between the storage controller and the host in response to receiving the IFIC from the host,
predict the requested boot data from among at least one piece of boot data based on the hint data included in the IFIC during the initialization of the interface, and
receive the boot data read command from the host after the prediction of the requested boot data and the initialization of the interface are completed, the boot data read command indicating the requested boot data, and
wherein the interface comprises a PHY layer interface, a link layer interface, and a transport layer interface,
the initialization of the interface initializes at least one of the PHY layer interface, the link layer interface, or the transport layer interface, and
wherein the storage controller obtains a data length of a PHY layer initialization command by counting a quantity of continuous logic low bits or a quantity of contiguous logic high bits of data included in the PHY layer initialization command to generate a counted result, and predicts the requested boot data based on the counted result.

16. The storage system of claim 15, wherein the host controller is configured to:
adjust the data length depending on the requested boot data,
incorporate a hint packet in the IFIC depending on the requested boot data, or
incorporate hint data to a header of the IFIC depending on the requested boot data.

17. The storage system of claim 15, further comprising:
a non-volatile memory configured to store the at least one piece of boot data; and
a volatile memory configured to store the requested boot data,
wherein the storage controller is configured to,
read the requested boot data among the at least one piece of boot data from the non-volatile memory, and
store the requested boot data in the volatile memory.

18. The storage system of claim 17, wherein
the host controller is configured to output the boot data read command over the interface after the initialization of the interface is completed, and
the storage controller is configured to output the requested boot data stored in the volatile memory to the host in response to the boot data read command.

\* \* \* \* \*